US009978336B2

(12) United States Patent
Kim et al.

(10) Patent No.: US 9,978,336 B2
(45) Date of Patent: May 22, 2018

(54) DISPLAY CONTROLLER AND SEMICONDUCTOR INTEGRATED CIRCUIT DEVICES INCLUDING THE SAME

(71) Applicant: SAMSUNG ELECTONICS CO., LTD., Suwon-si, Gyeonggi-Do (KR)

(72) Inventors: Kyoung Man Kim, Suwon-si (KR); Sung Chul Yoon, Hwaseong-si (KR); Xiangyu Meng, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days. days.

(21) Appl. No.: 14/984,365

(22) Filed: Dec. 30, 2015

(65) Prior Publication Data

US 2016/0189665 A1 Jun. 30, 2016

(30) Foreign Application Priority Data

Dec. 31, 2014 (KR) ........................ 10-2014-0195471

(51) Int. Cl.

*G09G 5/00* (2006.01)
*G06T 1/20* (2006.01)
*G09G 5/377* (2006.01)
*G09G 5/14* (2006.01)

(52) U.S. Cl.

CPC ............... *G09G 5/003* (2013.01); *G09G 5/14* (2013.01); *G09G 5/377* (2013.01); *G09G 2340/10* (2013.01); *G09G 2340/12* (2013.01); *G09G 2340/125* (2013.01); *G09G 2358/00* (2013.01); *G09G 2370/04* (2013.01); *G09G 2370/16* (2013.01)

(58) Field of Classification Search

CPC ................. G09G 5/14; G09G 2340/10; G09G 2340/125; G06T 11/60; H04N 5/44504

See application file for complete search history.

(56) References Cited

U.S. PATENT DOCUMENTS 8,010,612 B2 8/2011 Costea et al.
8,261,064 B2 9/2012 Ditzman et al.
8,312,539 B1 11/2012 Nachenberg et al.
8,745,699 B2 6/2014 Ganesan
2002/0166067 A1* 11/2002 Pritchard .......... G06F 17/30867 726/4
2009/0320048 A1* 12/2009 Watt ...................... G06F 9/4812 719/319
2010/0058248 A1 3/2010 Park (Continued)

FOREIGN PATENT DOCUMENTS

KR 1020020039489 5/2002
KR 101259824 4/2013
KR 101286711 7/2013

*Primary Examiner* — Todd Buttram

(74) *Attorney, Agent, or Firm* — F. Chau & Associates, LLC

(57) ABSTRACT

A display controller includes a first register set by an open operating system, a second register set by a secure operating system, a first data input circuit configured to read normal data according to set information in the first register, a second data input circuit configured to read secure data according to set information in the second register, and a data processor configured to blend and output the normal data with the secure data to display the secure data over the normal data.

20 Claims, 10 Drawing Sheets

(56) References Cited

U.S. PATENT DOCUMENTS

| | | | | |
|---|---|---|---|---|
| 2013/0219508 | A1* | 8/2013 | Lee | G06F 21/60 726/26 |
| 2014/0122820 | A1 | 5/2014 | Park et al. | |
| 2014/0376027 | A1* | 12/2014 | Adachi | G06F 21/608 358/1.14 |

* cited by examiner

DISPLAY CONTROLLER AND SEMICONDUCTOR INTEGRATED CIRCUIT DEVICES INCLUDING THE SAME

CROSS-REFERENCE TO RELATED APPLICATIONS

This application claims priority under 35 U.S.C. § 119(a) to Korean Patent Application No. 10-2014-0195471 filed on Dec. 31, 2014, the disclosure of which is incorporated by reference in its entirety herein.

BACKGROUND

1. Technical Field

Embodiments of the inventive concept relate to a display controller and a semiconductor integrated circuit device including the same, and more particularly, to a display controller that handles conversion from a non-secure mode to a secure mode and a semiconductor integrated circuit device including the same.

2. Discussion of Related Art

A mobile device is a small computing device, typically small enough to be handheld having a display screen with touch input and/or a miniature keyboard. A mobile device has an operating system and can run various types of application software. Mobile devices may be equipped with hardware and software that enable them to communicate over various networks wirelessly. Thus, mobile devices are likely to be exposed to security threats.

A secure operating system (OS) may be loaded onto a mobile device to reduce the exposure of the device to these security threats.

SUMMARY

According to an exemplary embodiment of the inventive concept, there is provided a display controller for controlling a display device. The display controller includes a first register set by an open operating system, a second register set by a secure operating system, a first data input circuit configured to read normal data according to set information in the first register, a second data input circuit configured to read secure data according to set information in the second register, and a data processor configured to blend the normal data with the secure data to generated blended data for display, the blended data including the secure data superimposed over the normal data.

The set information in the first register may include set information corresponding to the first data input circuit and set information corresponding to the second data input circuit and the set information in the second register may include a secure flag and the set information corresponding to the second data input block.

The second data input circuit may read the normal data when the secure flag is set to a first value and may read the secure data when the secure flag is set to a second value.

The display controller may further include a secure controller configured to control the second data input circuit according to the set information in the second register.

The second register may include secure screen attribute information and the display controller may control the data processor to blend the normal data with the secure data according to the secure screen attribute information.

According to an exemplary embodiment of the inventive concept, there is provided a semiconductor integrated circuit device including a processor configured to drive an open operating system and a secure operating system, a display controller configured to control a display device according to control of the processor, and a bus configured to transfer a control signal and data between the processor and the display controller. The display controller blends normal data with secure data to generated blended data in a secure mode, the blended data including the secure data superimposed over the normal data.

The display controller may include a first register set by the open operating system, a second register set by the secure operating system, and a plurality of data input circuits, where at least one of the data input circuits is configured to read the normal data and at least one of the data input circuits is configured to read the secure data.

When a secure flag bit is set in the second register, the display controller may assign at least one of the data input circuits to read the secure data. In an embodiment, the non-secure OS is prevented from updating the second register.

The second register may include set information corresponding to at least one of the data input circuits and the display controller may further include a secure controller configured to control the at least one of the data input circuits according to the set information in the second register.

The bus may include a first control port corresponding to the first register and a second control port corresponding to the second register.

In an embodiment, at least one of the data input circuits is set to read data corresponding to a topmost layer and at least one the data input circuits is set to read data corresponding to at least one lower layer.

According to an exemplary embodiment of the inventive concept, there is provided a method of operating a display controller. The method includes setting a first register of the display controller using an open operating system, setting a second register of the display controller using a secure operating system, reading normal data according to set information in the first register, reading secure data according to set information in the second register, and blending the normal data with the secure data to superimpose the secure data over the normal data.

The method may further include setting a secure flag bit in the second register.

According to an exemplary embodiment of the inventive concept, there is provided an electronic system including a display device and a semiconductor integrated circuit device configured to control the display device. The semiconductor integrated circuit device includes a processor configured to drive an open operating system and a secure operating system, a display controller configured to control the display device according to control of the processor, and a bus configured to transfer a control signal and data between the processor and the display controller. The display controller blends normal data with secure data to generate blended data in a secure mode, the blended data including the secure data superimposed over the normal data.

The display controller may include a first register set by the open operating system, a second register set by the secure operating system, and a plurality of data input circuits configured to read the normal data and the secure data.

According to an exemplary embodiment of the inventive concept, there is provided an a semiconductor integrated circuit including a central processing unit (CPU) configured to run an open operating system (OS) during a non-secure mode and a secure OS during a secure mode, a plurality of control circuits, a first register configured to store information indicating a first set of the control circuits allocated for retrieving normal image data of the non-secure mode, a second register configured to store information indicating a second set of the control circuits allocated for retrieving secure image data of the secure mode generated by the secure operating system, and a data processor configured to blend the normal image data with the secure image data for output to a display device during the secure mode.

In an embodiment, the semiconductor integrated circuit is a system-on chip. In an embodiment, the second register includes a flag indicating whether a mode of the circuit is set to the non-secure more or the secure mode. In an embodiment, the open OS is prevented from updating the second register. In an embodiment, the blending places the normal image data into a first layer of a screen of the display device, the secure image data into second layer of the screen, where the second layer is above the first layer. In an embodiment, the secure image data graphically provides information indicating that a security violation has occurred.

BRIEF DESCRIPTION OF THE DRAWINGS

The inventive concept will become more apparent by describing in detail exemplary embodiments thereof with reference to the attached drawings in which.

DETAILED DESCRIPTION OF THE EXEMPLARY EMBODIMENTS

Figure 1:
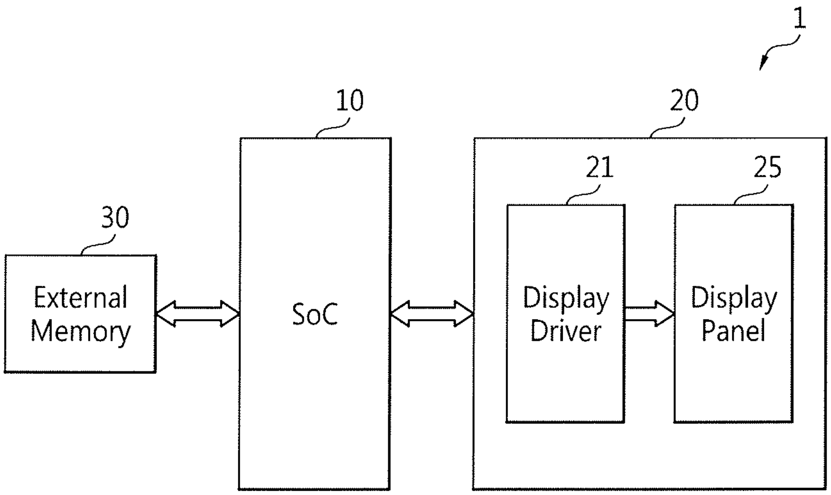
FIG. 1 is a block diagram of an electronic system according to an exemplary embodiment of the inventive concept.

The inventive concept now will be described more fully hereinafter with reference to the accompanying drawings, in which embodiments thereof are shown. The inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

Figure 2:
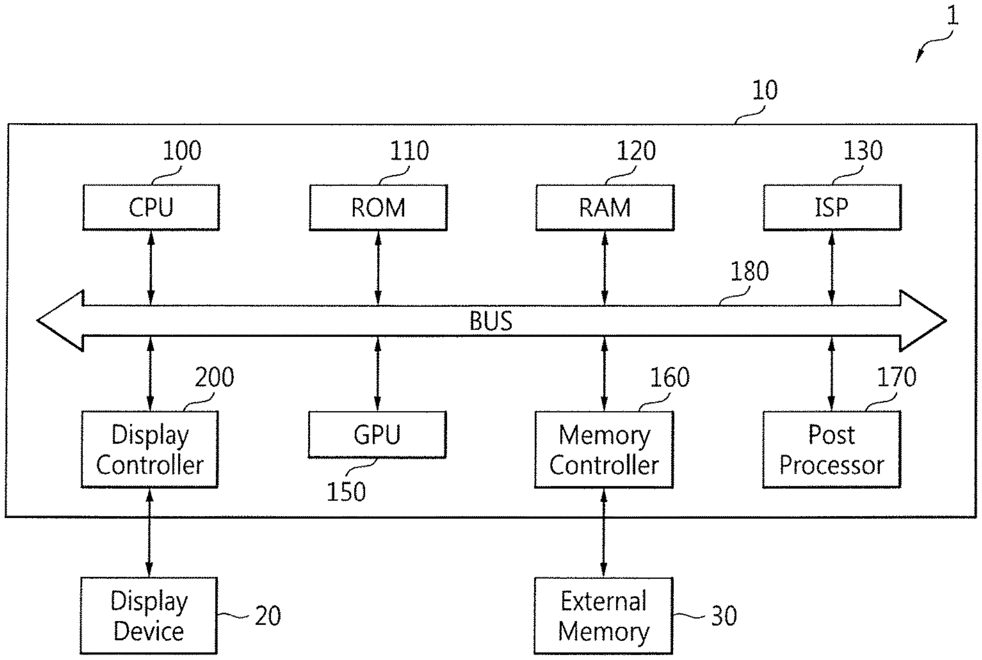
FIG. 2 is a block diagram of a system on chip (SoC) illustrated in FIG. 1 according to an exemplary embodiment of the inventive concept.

FIG. 1 is a block diagram of an electronic system 1 according to an exemplary embodiment of the inventive concept. FIG. 2 is a block diagram of a system on chip (SoC) 10 illustrated in FIG. 1 according to an exemplary embodiment of the inventive concept. Referring to FIGS. 1 and 2, the electronic system 1 may be implemented as a portable electronic device. The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer (e.g., a smartwatch), an internet of things (IoT) device, or an internet of everything (IoE) device.

The electronic system 1 includes a semiconductor integrated circuit device, i.e., the system on chip (SoC) 10, a display device 20, and an external memory 30. The elements 10, 20, and 30 may be formed in separate chips, respectively. The electronic system 1 may also include other elements such as a camera interface. The electronic system 1 may be a handheld device, a handheld computer, or a mobile device such as an automotive navigation system, a PMP MP3 player, a PDA, a tablet PC, a smart phone, or a mobile phone which can display a still image signal (or a still image) or a moving image signal (or a moving image) on a display panel 25.

The display device 20 includes a display driver 21 and the display panel 25. The SoC 10 and the display driver 21 may be formed together in a single module, a single SoC, or a single package such as a multi-chip package. Alternatively, the display driver 21 and the display panel 25 may be formed together in a single module.

The display driver 21 controls the operation of the display panel 25 according to signals output from the SoC 10. For instance, the display driver 21 may transmit image data received from the SoC 10 as an output image signal to the display panel 25 through a selected interface.

The display panel 25 may display an output image signal of the display driver 21. The display panel 25 may be formed of a liquid crystal display (LCD), a light emitting diode (LED), an organic LED (OLED), or an active-matrix OLED (AMOLED).

The external memory 30 stores program instructions executed in the SoC 10. The external memory 30 may also store image data used to display still images or a moving image on the display device 20. The moving image is a sequence of different still images presented in a short period of time.

The external memory 30 may be formed of volatile or non-volatile memory. The volatile memory may be dynamic random access memory (DRAM), static RAM (SRAM), thyristor RAM (T-RAM), zero capacitor RAM (Z-RAM), or twin transistor RAM (TTRAM). The non-volatile memory may be electrically erasable programmable read-only memory (EEPROM), flash memory, magnetic RAM (MRAM), phase-change RAM (PRAM), or resistive memory.

The SoC 10 controls the external memory 30 and/or the display device 20. The SoC 10 may be called an integrated circuit (IC), a processor, an application processor, a multimedia processor, or an integrated multimedia processor. The SoC 10 includes a central processing unit (CPU) 100, a read-only memory (ROM) 110, a random access memory (RAM) 120, an image signal processor (ISP) 130, a display controller 200, a graphics processing unit (GPU) 150, a memory controller 160, a post processor 170, and a system bus 180. The SoC 10 may also include other elements apart from those elements illustrated in FIG. 2.

The CPU 100, which may be referred to as a processor, may process or execute programs and/or data stored in the external memory 30. For instance, the CPU 100 may process or execute the programs and/or the data in response to an operating clock signal output from a clock signal module (not shown). The CPU 100 may be implemented as a multi-core processor. The multi-core processor is a single computing component with two or more independent actual processors (referred to as cores). Each of the processors reads and executes program instructions.

The CPU 100 runs an operating system (OS). The OS may manage resources of the electronic system 1. Examples of the resources that can be managed include memory resources and display resources of the electronic system 1. The OS may distribute the resources to applications executed in the electronic system 1. The OS may include an open OS (i.e., a non-secure OS such as Android® OS) and a secure OS (such as TrustZone® OS hereinafter referred to as "TZOS"). The CPU 100 may run only the open OS in a normal mode when no security threats are present and run only the secure OS in a secure mode when a security threat is present or may run both the secure OS and the open OS. In an embodiment, the secure operating system is a trusted operating system, a security-focused operating system, or a security-evaluated operating system.

Programs and/or data stored in the ROM 110, the RAM 120, and/or the external memory 30 may be loaded to a memory (not shown) in the CPU 100 when necessary. The ROM 110 may store permanent programs and/or data. The ROM 110 may be implemented as erasable programmable ROM (EPROM) or EEPROM.

The RAM 120 may temporarily store programs, data, or instructions. The programs and/or data stored in the memory 110 or 30 may be temporarily stored in the RAM 120 according to the control of the CPU 100 or a booting code stored in the ROM 110. The RAM 120 may be implemented as DRAM or SRAM.

The ISP 130 may perform various kinds of image signal processing. The ISP 130 may process image data received from an image sensor (not shown). For instance, the ISP 130 may perform shake correction and white balance on the image data received from the image sensor. For example, if a user moves or shakes a digital camera while taking a photograph, it can result in a blurred image. Thus, a shake correction or image stabilization method may be used to achieve clearer images. White balance may be a process of removing unrealistic colors casts, so that objects that actually appear white are rendered as the same white in the image data. The ISP 130 may also perform color correction in terms of brightness or contrast, color harmony, quantization, color conversion into a different color space, and so on. The ISP 130 may periodically store the processed image data in the external memory 30 via the system bus 180.

The GPU 150 may read and execute program instructions involved in graphics processing. The GPU 150 may perform graphical processing at a high speed. The GPU 150 may also convert data read by the memory controller 160 from the external memory 30 into a signal suitable for the display device 20. Apart from the GPU 160, a graphics engine (not shown) or a graphics accelerator (not shown) may also be used for graphics processing.

The post processor 170 may perform post processing on an image or an image signal so the result is suitable for an output device (e.g., the display device 20). The post processor 170 may enlarge or reduce or rotate an image to be suitable for output. The post processor 170 may store the post-processed image data in the external memory 30 via the system bus 180 or may directly output the post-processed image to the display controller 200 on the fly.

The memory controller 160 interfaces with the external memory 30. The memory controller 160 controls the overall operation of the external memory 30 and controls data exchange between a host and the external memory 30. For instance, the memory controller 160 may write data to or read data from the external memory 30 at the request of a host. Here, the host may be a master device such as the CPU 100, the GPU 150, or the display controller 200. The memory controller 160 may read image data from the external memory 30 and provide the image data for the display controller 200 in response to an image data request of the display controller 200.

The display controller 200 controls the operations of the display device 20. The display controller 200 receives image data to be displayed on the display device 20 via the system bus 180, converts the image data into a signal (e.g., a signal complying with an interface standard) for the display device 20, and transmits the signal to the display device 20. The display controller 200 may request frame data from the memory controller 160 at a predetermined interval and receive image data frame by frame.

The elements 100, 110, 120, 130, 150, 160, 170, and 200 may communicate with one another via the system bus 180. In other words, the system bus 180 connects to each of the elements 100, 110, 120, 130, 150, 160, 170, and 200 to function as a passage for data transmission between elements. The system bus 180 may also function as a passage for transmission of a control signal between elements.

The system bus 180 may include a data bus (181 in FIG. 3) for transmitting data, an address bus (not shown) for transmitting an address signal, and a control bus (not shown) for transmitting a control signal. The system bus 180 may include a small-scale bus, i.e., an interconnector for data communication between predetermined elements. The system bus 180 may be an advance extensible interface (AXI) bus but is not limited thereto.

Figure 3:
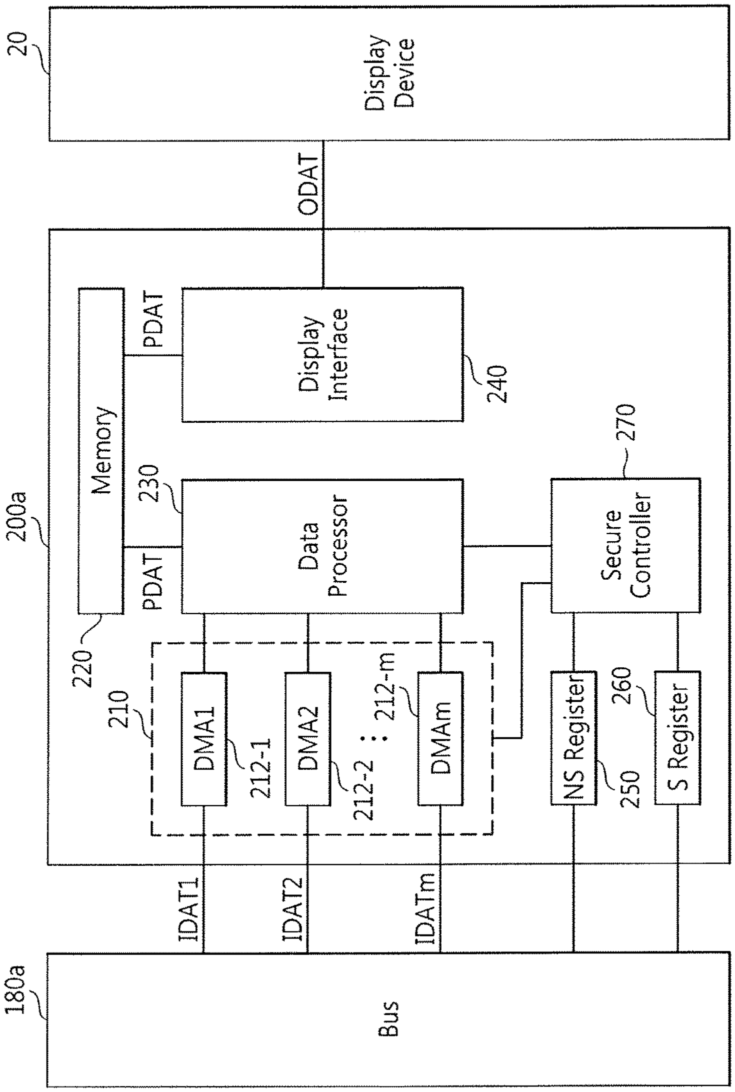
FIG. 3 is a block diagram of an example of a display controller illustrated in FIG. 2.
Figure 4:
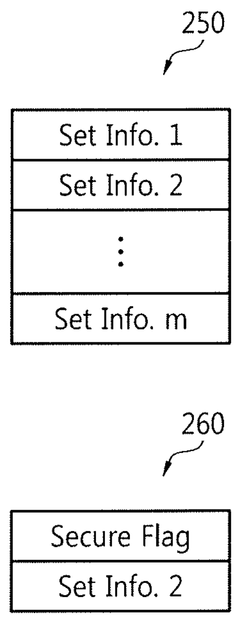
FIG. 4 is a diagram of information items set in first and second registers illustrated in FIG. 3 according to an exemplary embodiment of the inventive concept.

FIG. 3 is a block diagram of a display controller 200*a*, which could be used to implement the display controller 200 illustrated in FIG. 2. FIG. 4 is a diagram of information items set in first and second registers 250 and 260 illustrated in FIG. 3 according to an exemplary embodiment of the inventive concept. Referring to FIGS. 1 through 4, the display controller 200*a* includes a data input unit 210 (e.g., a data input circuit), a buffer memory 220, a data processor 230, a display interface 240, the first register 250, the second register 260, and a secure controller 270.

The first register 250 is a normal register set by an open OS and the second register 260 is a secure register set by a secure OS. The data input unit 210 reads input data sets IDAT1 through IDATm via a bus 180*a*. The data input unit 210 may include a plurality of, for example, first through m-th (where "m" is a natural number of at least 2) data input blocks 212-1 through **212-*m*** (e.g., data input sub-circuits).

The first through m-th data input blocks 212-1 through **212-*m* may read the first through m-th input data sets IDAT1 through IDATm, respectively, according to information set in the first or second register 250 or 260. The sources of the first through m-th input data sets IDAT1 through IDATm may be different from each other. For instance, each of the first through m-th input data sets IDAT1 through IDATm may be data that has been stored in the external memory 30 or data output from another module, such as the ISP 130, the GPU 150, or the post processor 170, of the SoC 10**.

In an embodiment, the first register 250 includes information necessary to read normal data and information necessary to process (or blend) the normal data. As shown in FIG. 4, the first register 250 may include set information items Set Info. 1 through Set Info. m for the data input blocks 212-1 through **212-*m***, respectively. The data input blocks may also be referred to as control circuits.

The first set information item Set Info. 1 may include information necessary for the first data input block 212-1 to read the first input data set IDAT1, such as address information and data size of the first input data set IDAT1. Similarly, the second set information item Set Info. 2 may include information necessary for the second data input block 212-2 to read the second input data set IDAT2, such as address information and data size of the second input data set IDAT2.

In an exemplary embodiment, in the normal mode, the first through m-th data input blocks 212-1 through **212-*m* respectively read the first through m-th input data sets IDAT1 through IDATm according to the set information items Set Info. 1 through Set Info. m, respectively. In an embodiment, the first through m-th input data sets IDAT1 through IDATm correspond to normal data (e.g., normal image data) displayed on a normal layer (e.g., 310 in FIGS. 8A and 8B). A scene displayed on the display panel 25 may be presented on one or more layers. Data (e.g., 310 in FIGS. 8A and 8B) presented on a lower layer may be covered with data (e.g., 320 in FIG. 8**B) presented on an upper layer. In an embodiment, image data presented in a region of the upper layer takes precedence over image data presented in the same region of the lower layer. For example, image data in the region of the upper layer may completely overwrite image data in the region of the lower layer. In an embodiment, parts of the image data in the region of the upper layer are divided into translucent parts and non-translucent parts. In this embodiment, when the image data of the upper layer is overlaid with the image data in a same region of the lower layer, the parts of image data of the lower layer bounded by the translucent parts are still visible and the parts of the image data of the lower layer bounded by the non-translucent parts of the upper layer are overwritten by the non-translucent parts.

Alternatively, the first register 250 may store set information regarding some of the first through m-th data input blocks 212-1 through **212-*m*. In an embodiment, the data input blocks corresponding to the set information in the first register 250** read normal data.

In an embodiment, the second register 260 includes information necessary to read secure data and information necessary to process (or blend) the secure data that has been read. The second register 260 may store set information regarding some of the first through m-th data input blocks 212-1 through **212-*m*. In an embodiment, the data input blocks corresponding to the set information in the second register 260 read secure data. In the embodiments illustrated in FIG. 4, the second register 260 includes the set information item Set Info. 2 corresponding to the second data input block 212-2. Therefore, the second data input block 212-2 reads secure data in the secure mode according to the set information item Set Info. 2 in the second register 260**. In an embodiment, during the secure mode, the secure OS is configured to determine whether one or more security violations has occurred or is currently occurring (e.g., an unauthorized user is currently accessing or to attempting to access data on the device), and generates secure data comprising image data that illustrates the nature of the violation. The image data may include text describing the type of security violation and/or symbols or other imagery representing the security violation.

The set information item Set Info. 2 may include information necessary for the second data input block 212-2 to read the second input data set IDAT2, such as address information and data size of the second input data set IDAT2. For example, the address information may indicate the location in memory in which the second input data set IDAT2 is stored. The second input data set IDAT2 is secure data to be displayed on a secure screen (or a secure layer 320 in FIG. 8B) because the second register 260 includes the Set Info. 2 and the device is in the secure mode. In an exemplary embodiment, the secure layer is the topmost layer.

As shown in FIG. 4, when the set information, i.e., the set information item Set Info. 2 corresponding to the second data input block 212-2 is stored in both the first and second registers 250 and 260; the second data input block 212-2 is assigned to read normal data in the normal mode and is assigned to read secure data in the secure mode. In other words, among the first through m-th data input blocks 212-1 through **212-*m*, a data input block having set information stored in both the first and second registers 250 and 260 is used to read normal data in the normal mode and used to read secure data in the secure mode. Accordingly, data input blocks other than the second data input block 212-2** can continue the same operation as that performed in the normal mode even after conversion from the normal mode into the secure mode.

The data input block (e.g., the second data input block 212-2) having set information stored in common in both the first and second registers 250 and 260 reads data corresponding to the topmost layer. The data input blocks (e.g., the first data input block 212-1 and the third through m-th data input blocks 212-3 through **212-*m*) having set information stored in only the first register 250** reads data corresponding to a lower layer or lower layers other than the topmost layer.

The second register 260 may also include a secure flag, as shown in FIG. 4. The secure flag is information indicating whether the device is in the secure mode or a non-secure mode (e.g., normal mode). The secure flag may be one or more bits. When the secure flag is set to a first value, it indicates the non-secure mode. When the secure flag is set to a second value different from the first value, it indicates the secure mode. The second register 260 may also include secure screen attribute information. The secure screen attribute information may include information on the size, position and transparency of a secure screen (320 in FIG. 8B) on which the secure data is displayed. In an embodiment, when the transparency information indicates the secure data is transparent, portions of the normal data overlaid with colored portions of the secure data of a certain color (e.g. white) on the display device 20 are visible. In an embodiment, when the transparency information indicates the secure data is non-transparent (e.g., opaque), portions of the normal data overlaid with the colored portions of the secure data on the display device 20 are overwritten by the colored portions.

The data processor 230 may process data output from the data input unit 210 and store processed data PDAT in the buffer memory 220. In an embodiment, in the normal mode, the data processor 230 blends data (e.g., superimposes), e.g., the first through m-th input data sets IDAT1 through IDATm, output from the data input unit 210. The data processor 230 may blend the first through m-th input data sets IDAT1 through IDATm so that the first through m-th input data sets IDAT1 through IDATm are displayed on a single layer or a corresponding one of at least two layers.

In an embodiment, in the secure mode, the data processor 230 blends the normal data and the secure data output from the data input unit 210 according to the control of the secure controller 270 so that the secure data is displayed over the normal data. For instance, when the first input data set IDAT1 and the third through m-th input data sets IDAT3 through IDATm are the normal data and the second input data set IDAT2 is the secure data, the data processor 230 blends the first through m-th input data sets IDAT1 through IDATm so that the second input data set IDAT2 is displayed on the topmost layer and the first input data set IDAT1 and the third through m-th input data sets IDAT3 through IDATm are displayed on a lower layer or layer layers. The processed data PDAT output from the data processor 230 may be stored in the buffer memory 220.

In the secure mode, the secure controller 270 controls the data input block (e.g., the second data input block 212-2) to read the secure data according to the set information in the second register 260 and controls the data processor 230 to blend the secure data that has been read with the normal data according to the secure screen attribute information.

The display interface 240 may read the processed data PDAT from the buffer memory 220 and output the processed data ODAT to the display device 20 according to a predetermined interface standard, which may be mobile industry processor interface (MIPI®) but is not limited thereto. The display interface 240 may convert the processed data PDAT read from the buffer memory 220 according to the predetermined standard.

Figure 5:
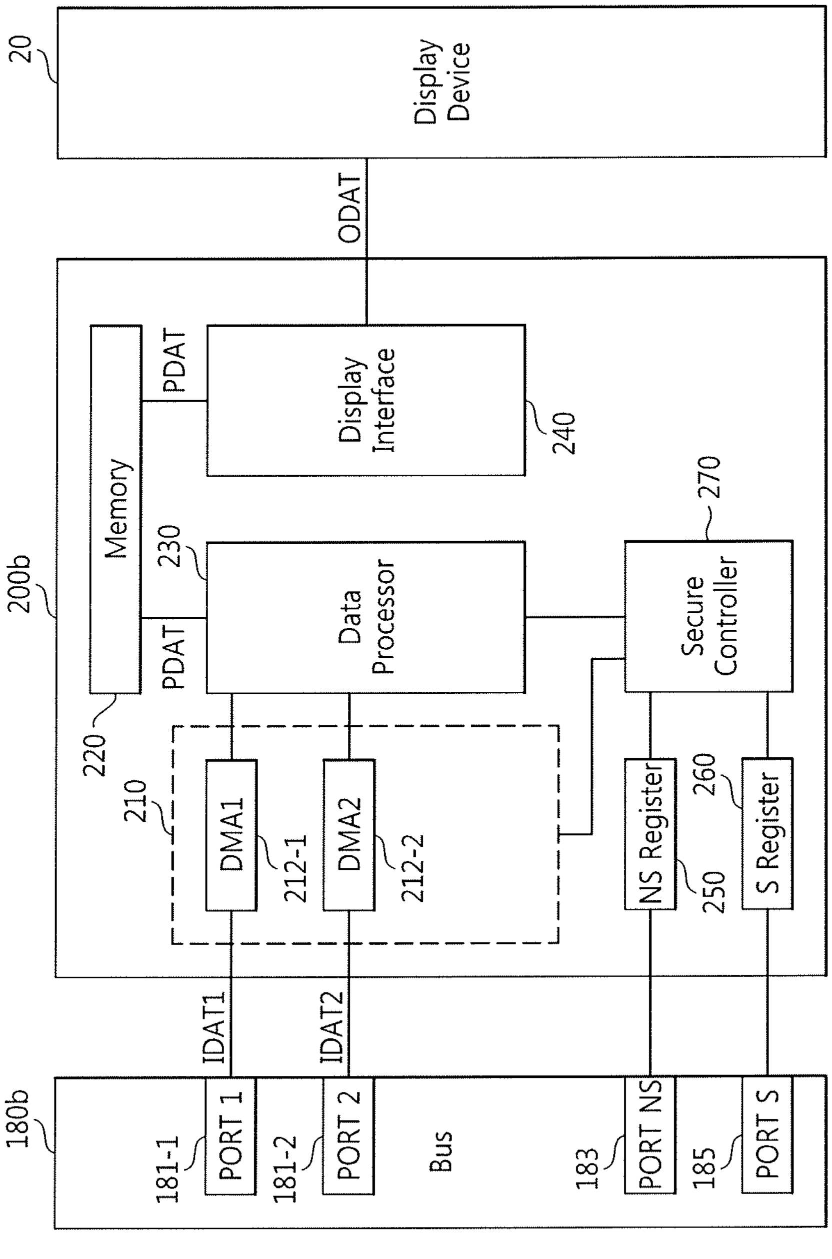
FIG. 5 is a block diagram of an example of the display controller illustrated in FIG. 2.

FIG. 5 is a block diagram of a display controller 200*b* that can be used to implement the display controller 200 illustrated in FIG. 2. The structure and operations of the display controller 200*b* illustrated in FIG. 5 are similar to those of the display controller 200*a* illustrated in FIG. 3, and therefore, the descriptions will be focused on the differences between the display controllers 200*a* and 200*b* to avoid redundancy.

Referring to FIG. 5, the data input unit 210 includes the first and second data input blocks 212-1 and 212-2. In other words, the embodiments illustrated in FIG. 5 are cases where “m” is 2 in the embodiments illustrated in FIG. 3.

A bus 180*b* include a plurality of control ports 181-1, 181-2, 183, and 185. The control port 181-1 corresponds to the first data input block 212-1 and the control port 181-2 corresponds to the second data input block 212-2. The first control port 183 corresponds to the first register 250 and the second control port 185 corresponds to the second register 260.

The first register 250 may be set by either an open OS or a secure OS according to the value of the first control port 183. For instance, when the value of the first control port 183 is set to a first value (e.g., “0”), the first register 250 is set by the open OS. When the value of the first control port 183 is set to a second value (e.g., “1”), the first register 250 is set by only the secure OS and cannot be set by the open OS.

The second register 260 may be set by the secure OS according to the value of the second control port 185. The values of the first and second control ports 183 and 185 may be set by a particular controller (e.g., TrustZone Protection Controller (TZPC) (not shown)), but the inventive concept is not limited to this example. Alternatively, the value of the first control port 183 may be set by a particular controller (e.g., TZPC) and the value of the second control port 185 may be fixed to a certain value (e.g., “1”).

Figure 6:
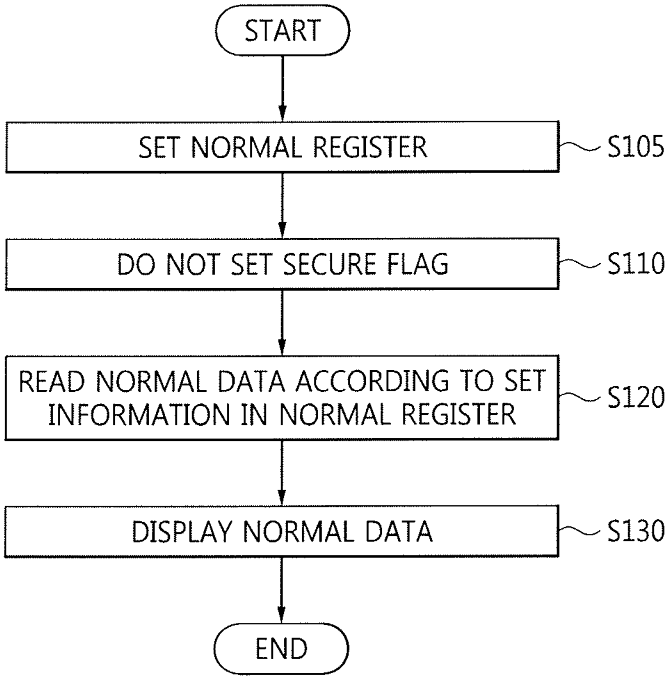
FIG. 6 is a flowchart of a method of operating a display controller in a normal mode according to an exemplary embodiment of the inventive concept.

FIG. 6 is a flowchart of a method of operating a display controller in a normal mode according to an exemplary embodiment of the inventive concept. The method illustrated in FIG. 6 may be performed by the display controller 200*b* illustrated in FIG. 5.

Referring to FIGS. 5 and 6, the value of the first control port 183 is set to “0” by a particular controller (e.g., TZPC) in the normal mode, and therefore, the first register 250 is set by an open OS in operation S105. For instance, the set information items Set Info. 1 and Set Info. 2 respectively corresponding to the first and second data input blocks 212-1 and 212-2 are set by the open OS in the first register 250 in operation S105.

The open OS running in the normal mode does not have an access right to the second register 260. Accordingly, no secure flag is set in operation S110. For instance, the secure flag of the second register 260 is maintained at a first value indicating a non-secure mode. Therefore, the first and second data input blocks 212-1 and 212-2 may read the first and second input data sets IDAT1 and IDAT2, respectively, which are normal data, according to set information in the first register 250 in operation S120.

The data processor 230 may process data output from the data input unit 210 and may store the processed data PDAT in the buffer memory 220. For instance, the data processor 230 may blend and store the first and second input data sets IDAT1 and IDAT2 in the buffer memory 220 so that the first input data set IDAT1 is displayed on a first layer corresponding to a lower layer and the second input data set IDAT2 is displayed on a second layer corresponding to an upper layer.

Figure 8A:
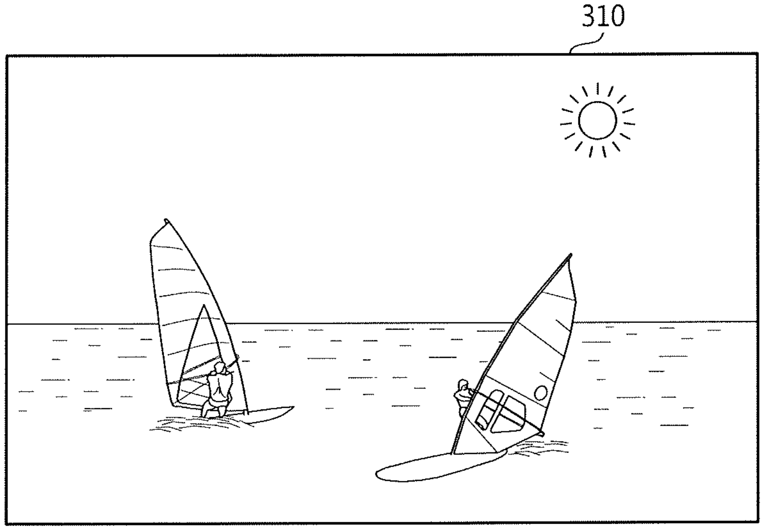
FIG. 8A is a diagram of a display screen displaying normal data according to an exemplary embodiment of the inventive concept.

The display interface 240 may read the processed data PDAT from the buffer memory 220 and convert the processed data PDAT according to a predetermined interface standard, so that the normal data is displayed, as shown in FIG. 8A, in operation S130. FIG. 8A is a diagram of a display screen displaying the normal data according to an embodiment of the inventive concept. Referring to FIG. 8A, only the normal layer 310 is displayed in the normal mode.

Figure 7:
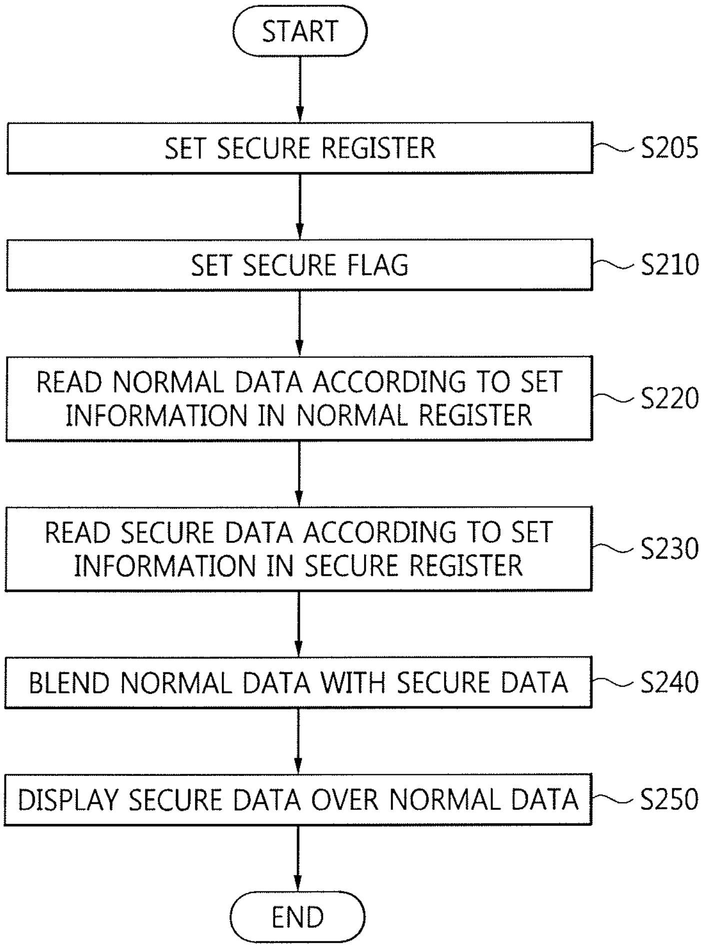
FIG. 7 is a flowchart of a method of operating a display controller in a secure mode according to an exemplary embodiment of the inventive concept.

FIG. 7 is a flowchart of a method of operating a display controller in a secure mode according to an exemplary embodiment of the inventive concept. The method illustrated in FIG. 7 may be performed by the display controller 200*b* illustrated in FIG. 5.

Referring to FIGS. 5 and 7, the value of the second control port 185 is set to “1” by a particular controller (e.g., TZPC) in the secure mode or is fixed to “1”, and therefore, the second register 260 is set by only a secure OS in operation S205. For instance, the set information item Set Info. 2 corresponding to the second data input block 212-2 is set by the secure OS in the second register 260 in operation S205.

A secure flag is set by the secure OS in operation S210. For instance, the secure flag of the second register 260 is set to a second value indicating a secure mode. The second data input block 212-2 reads the second input data set IDAT2, which is secure data, according to the set information in the second register 260 in operation S230. The set information in the first register 250 is maintained in the secure mode.

However, since the set information in the second register 260 has priority over the set information in the first register 250 in the secure mode, the second data input block 212-2 reads the second input data set IDAT2 corresponding to the secure data according to the control of the secure controller 270 in operation S230 even when the set information Set Info. 1 for the first data input block 212-1 is maintained in the first register 250.

Meanwhile, the first data input block 212-1 continues to read the first input data set IDAT1 corresponding to the normal data according to the set information in the first register 250 in operation S220. Although operations are sequentially illustrated in FIG. 2 for convenience' sake in the description, the inventive concept is not limited to the sequence of operations illustrated in FIG. 7. In other embodiments, the order of operations illustrated in FIG. 7 may be changed or at least two operations may be performed in parallel.

The data processor 230 may blend the normal data, i.e., the first input data set IDAT1 read by the first data input block 212-1 with the secure data, i.e., the second input data set IDAT2 read by the second data input block 212-2 and store the blended data PDAT in the buffer memory in operation S240. For instance, the data processor 230 may blend and store the first input data set IDAT1 with the second input data set IDAT2 in the buffer memory 220 so that the first input data set IDAT1 corresponding to the normal data is displayed on a first layer corresponding to a lower layer and the second input data set IDAT2 corresponding to the secure data is displayed on a second layer corresponding to an upper layer in operation S240.

Figure 8B:
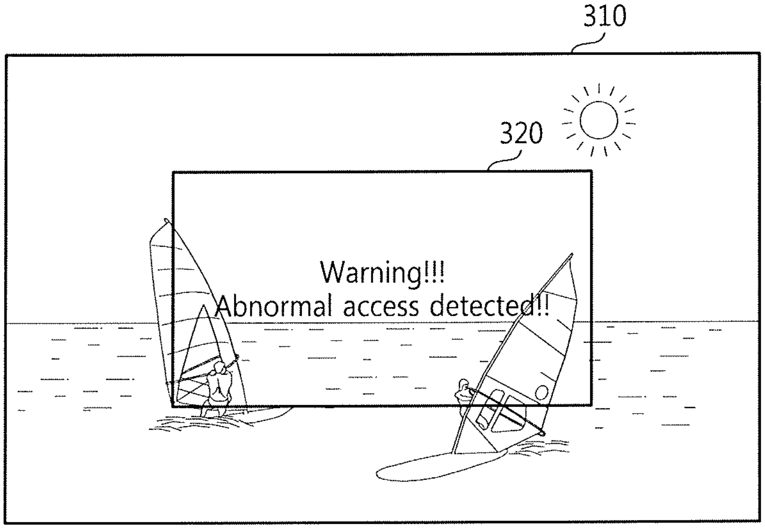
FIG. 8B is a diagram of a display screen displaying normal data and secure data according to an exemplary embodiment of the inventive concept.

The display interface 240 may read the data PDAT from the buffer memory 220 and convert the data PDAT according to a predetermined interface standard, so that the secure data is superimposed on the normal data, as shown in FIG. 8B, in the display device 20 in operation S250. FIG. 8B is a diagram of a display screen displaying both the normal data and the secure data according to an exemplary embodiment of the inventive concept.

As described above, according to some embodiments of the inventive concept, set information in the normal register 250 is maintained even in the secure mode. Accordingly, while at least some data input blocks (e.g., the first through (m−1)-th data input blocks 212-1 through 212-(*m*−1) among the first through m-th data input blocks 212-1 through 212-*m*) continue to read normal data according to the set information in the normal register 250, the other data input block (e.g., the m-th data input block 212-*m*) among the first through m-th data input blocks 212-1 through 212-*m* reads secure data according to the set information in the secure register 260. As a result, display of the normal data is not interrupted and both the secure data and the normal data are displayed together even after the conversion from the normal mode into the secure mode. In other words, the secure layer 320 presenting the secure data is superimposed on the normal layer 310 presenting the normal data. Therefore, a user is allowed to maintain as best a user experience (e.g., watching a film or web search) in the normal mode as possible in the secure mode. In addition, according to some embodiments of the inventive concept, some of a plurality of data input blocks are used both in the normal mode and the secure mode, thereby allowing resource sharing.

Figure 9A:
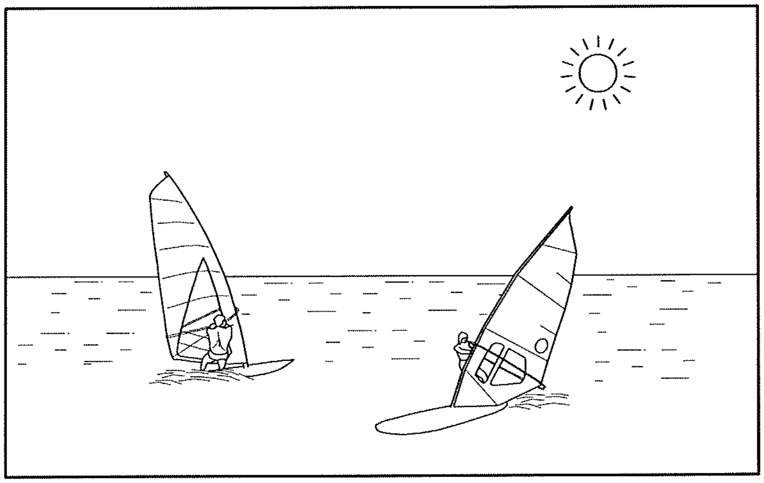
FIG. 9A is a diagram of a display screen displaying normal data in a comparison example.
Figure 9B:
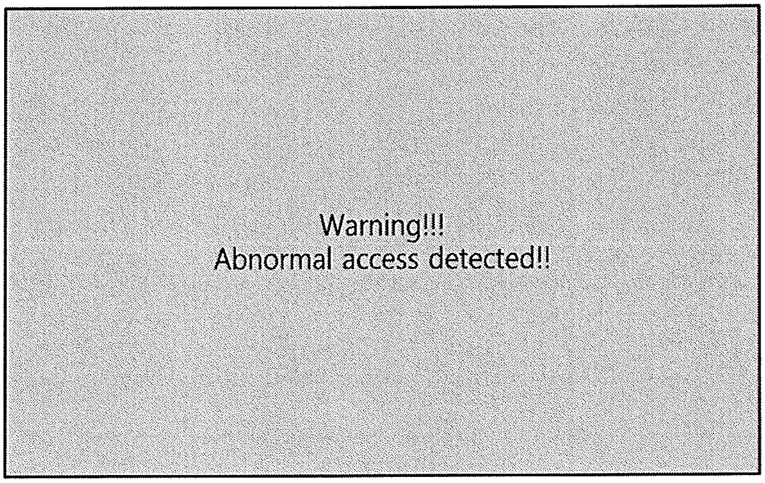
FIG. 9B is a diagram of a display screen displaying normal data and secure data in a comparison example.

FIG. 9A is a diagram of a display screen displaying the normal data in a comparison example. FIG. 9B is a diagram of a display screen displaying the normal data and the secure data in a comparison example.

When FIG. 9A is compared with FIG. 8A, the display screen displaying the normal data in the comparison example is similar to the display screen displaying the normal data in some embodiments of the inventive concept. However, when FIG. 9B is compared with FIG. 8B, the normal layer is not displayed and only the secure layer is displayed in the secure mode in the comparison example. In other words, the screen displayed in the normal mode completely disappears and only the secure layer presenting the secure data is displayed. Since the user experience (e.g., watching a film or web search) of a user in the normal mode completely disappears, a natural user experience is disrupted.

Figure 10:
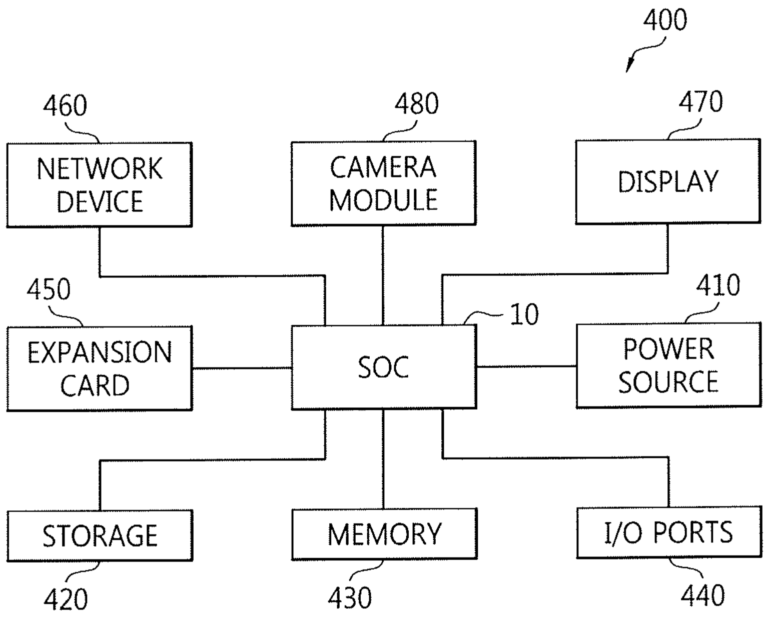
FIG. 10 is a block diagram of an electronic system according to an exemplary embodiment of the inventive concept.

FIG. 10 is a block diagram of an electronic system 400 according to an exemplary embodiment of the inventive concept. The electronic system 400 may be implemented as a PC, a data server, a laptop computer, or a portable device. The portable device may be a mobile telephone, a smart phone, a tablet PC, a PDA, an EDA, a digital still camera, a digital video camera, a PMP, a personal navigation device or portable navigation device (PND), a handheld game console, or an e-book reader device.

The electronic system 400 includes the SoC 10, a power source 410 (e.g., a power supply), a storage 420 (e.g., storage device), a memory 430, I/O ports 440, an expansion card 450, a network device 460, and a display 470. The electronic system 400 may also include a camera module 480.

The SoC 10 may control the operation of at least one of the elements 410 through 480. The SoC 10 may be the SoC 10 illustrated in FIGS. 1 and 2.

The power source 410 may supply an operating voltage to at least one of the elements 10 and 420 through 480. The storage 420 may be implemented as a hard disk drive (HDD) or a solid state drive (SSD).

The memory 430 may be implemented as a volatile or non-volatile memory. A memory controller (not shown), which controls a data access operation such as a read operation, a write operation (or a program operation), or an erase operation on the memory 430, may be integrated into or embedded in the SoC 10. Alternatively, the memory controller may be provided between the SoC 10 and the memory 430.

The I/O ports 440 may receive data transmitted to the electronic system 400 or transmit data from the electronic system 400 to an external device. For instance, the I/O ports 440 may include a port for connection with a pointing device such as a computer mouse, a port for connection with a printer, or a port for connection with a universal serial bus (USB) drive.

The expansion card 450 may be implemented as a secure digital (SD) card or a multimedia card (MMC). The expansion card 450 may be a subscriber identity module (SIM) card or a universal SIM (USIM) card.

The network device 460 enables the electronic system 400 to be connected with a wired or wireless network. The display 470 displays data output from the storage 420, the memory 430, the I/O ports 440, the expansion card 450, or the network device 460.

The camera module 480 is a module that can convert an optical image into an electrical image. Accordingly, the electrical image output from the camera module 480 may be stored in the storage 420, the memory 430, or the expansion card 450. In addition, the electrical image output from the camera module 480 may be displayed through the display 470.

As described above, according to at least one embodiment of the inventive concept, display of normal data is not interrupted and both secure data and normal data are displayed together even after the conversion from a normal mode into a secure mode. In other words, a secure layer presenting the secure data may be superimposed on a normal layer presenting the normal data. Therefore, a user is allowed to maintain as best a user experience (e.g., watching a film or web search) in the normal mode as possible in the secure mode.

While the inventive concept has been particularly shown and described with reference to exemplary embodiments thereof, it will be understood by those of ordinary skill in the art that various changes in forms and details may be made therein without departing from the spirit and scope of the inventive concept.

What is claimed is:

1. A display controller for controlling a display device, the display controller comprising:

a first register set by an open operating system;

a second register set by a secure operating system;

a first data input circuit configured to read normal data according to set information in the first register;

a second data input circuit configured to read secure data according to set information in the second register; and a data processor configured to blend the normal data with the secure data to generate blended data for display, the blended data including the secure data superimposed over the normal data, wherein the set information in the first register comprises first set information identifying the first data input circuit and second set information identifying the second data input circuit and the set information in the second register comprises the second set information identifying the second data input circuit.

2. The display controller of claim 1, wherein the set information in the second register further comprises a secure flag.

3. The display controller of claim 2, wherein the second data input circuit reads the normal data when the secure flag is set to a first value and reads the secure data when the secure flag is set to a second value.

4. The display controller of claim 1, further comprising a secure controller configured to control the second data input circuit according to the set information in the second register.

5. The display controller of claim 4, wherein the second register comprises secure screen attribute information and the display controller controls the data processor to blend the normal data with the secure data according to the secure screen attribute information.

6. The display controller of claim 1, wherein the first register is set by either of the open operating system and the secure operating system according to a value of a first control port corresponding to the first register and the second register is set by the secure operating system according to a value of a second control port corresponding to the second register.

7. The display controller of claim 1, further comprising a third data input circuit configured to read normal data according to the set information in the first register, wherein the second data input circuit is set to read data corresponding to a topmost layer and the first and third data input circuits are set to read data corresponding to at least one lower layer.

8. The display controller of claim 7, wherein the set information in the first register is maintained after conversion from a normal mode into a secure mode.

9. A semiconductor integrated circuit comprising:

a processor configured to drive an open operating system and a secure operating system;

a display controller configured to control a display device according to control of the processor; and a bus configured to transfer a control signal and data between the processor and the display controller, wherein the display controller blends normal data with secure data to generate blended data in a secure mode, the blended data comprising secure image data of the secure data superimposed over the normal data, wherein the secure image data graphically provides information indicating that an unauthorized user is currently accessing or attempting to access the secure data, wherein the display controller comprises first and second registers and a plurality of data input circuits, wherein at least one of the data input circuits identified by the first register is configured to read the normal data, and wherein at least one of the data input circuits identified by the second register is configured to read the secure data.

10. The semiconductor integrated circuit of claim 9, wherein the first register is set by the open operating system and the second register is set by the secure operating system.

11. The semiconductor integrated circuit device of claim 10, wherein when a secure flag bit is set in the second register, the display controller assigns at least one of the data input circuits to read the secure data.

12. The semiconductor integrated circuit device of claim 11, wherein the second register comprises set information corresponding to at least one of the data input circuits and the display controller further comprises a secure controller configured to control the at least one of the data input circuits according to the set information in the second register.

13. The semiconductor integrated circuit of claim 12, wherein the display controller further comprises a data processor configured to blend the normal data with the secure data according to control of the secure controller and the secure controller controls the data processor to blend the normal data with the secure data according to attribute information of a secure screen on which the secure data is displayed.

14. The semiconductor integrated circuit of claim 10, wherein when a secure flag bit is not set in the second register, the display controller assigns the data input circuits to read the normal data according to set information in the first register.

15. A semiconductor integrated circuit comprising:

a central processing unit (CPU) configured to run an open operating system (OS) during a non-secure mode and a secure OS during a secure mode;

a plurality of control circuits;

a first register configured to store information indicating a first set of the control circuits allocated for retrieving normal image data of the non-secure mode;

a second register configured to store information indicating a second set of the control circuits allocated for retrieving secure image data of the secure mode generated by the secure operating system; and a data processor configured to blend the normal image data with the secure image data for output to a display device during the secure mode, wherein the first set of the control circuits identified by the first register is configured to read the normal image data, and wherein the second set of the control circuits identified by the second register is configured to read the secure image data.

16. The semiconductor integrated circuit of claim 15, wherein the semiconductor integrated circuit is a system-on chip.

17. The semiconductor integrated circuit of claim 15, wherein the second register includes a flag indicating whether a mode of the circuit is set to the non-secure mode or the secure mode.

18. The semiconductor integrated circuit of claim 15, wherein the open OS is prevented from updating the second register.

19. The semiconductor integrated circuit of claim 15, wherein the blending places the normal image data into a first layer of a screen of the display device, the secure image data into second layer of the screen, where the second layer is above the first layer.

20. The semiconductor integrated circuit of claim 19, wherein the secure image data graphically provides information indicating that a security violation has occurred.

* * * * *